(12) United States Patent
Kauper et al.

(10) Patent No.: US 8,956,089 B2
(45) Date of Patent: Feb. 17, 2015

(54) DRILL

(75) Inventors: Herbert Rudolf Kauper, Erlangen (DE); Juergen Schwaegerl, Vohenstrauss (DE)

(73) Assignee: Kennametal Inc., Latrobe, PA (US)

( * ) Notice: Subject to any disclaimer, the term of this patent is extended or adjusted under 35 U.S.C. 154(b) by 674 days.

(21) Appl. No.: 12/992,018

(22) PCT Filed: Jun. 5, 2009

(86) PCT No.: PCT/EP2009/004030
§ 371 (c)(1),
(2), (4) Date: Jan. 25, 2011

(87) PCT Pub. No.: WO2009/149869
PCT Pub. Date: Dec. 17, 2009

(65) Prior Publication Data
US 2011/0150589 A1 Jun. 23, 2011

(30) Foreign Application Priority Data
Jun. 12, 2008 (DE) .......................... 10 2008 028 060

(51) Int. Cl.
*B23B 51/00* (2006.01)
*B23B 51/04* (2006.01)

(52) U.S. Cl.
CPC ................. *B23B 51/04* (2013.01); *B23B 51/00* (2013.01); *B23B 2251/406* (2013.01); *Y10S 408/705* (2013.01)
USPC ............................ 408/211; 408/229; 408/705

(58) Field of Classification Search
CPC .. B23B 51/00; B23B 51/04; B23B 2251/406; B23B 2251/40; B23B 2251/424
USPC .......................... 408/211, 229, 705, 223, 227
IPC ....................................................... B23B 51/00
See application file for complete search history.

(56) References Cited

U.S. PATENT DOCUMENTS

| | | | | |
|---|---|---|---|---|
| 85,107 A | * | 12/1868 | LeCount | 408/224 |
| 161,106 A | * | 3/1875 | Farmer | 408/229 |
| 262,588 A | * | 8/1882 | Hartshorn | 408/230 |
| 571,253 A | * | 11/1896 | Wesselmann et al. | 408/223 |
| 1,603,739 A | * | 10/1926 | Borgeson | 408/229 |

(Continued)

FOREIGN PATENT DOCUMENTS

| | | | | |
|---|---|---|---|---|
| EP | 0089123 A | | 9/1983 | |
| EP | 195838 A1 | * | 10/1986 | B23D 77/00 |

(Continued)

OTHER PUBLICATIONS

State Intellectual Property Office of the People's Republic of China, "Notification of the First Action" (and English language translation thereof), Jan. 11, 2012, 8 pp.

*Primary Examiner* — Eric A Gates
(74) *Attorney, Agent, or Firm* — Larry R. Meenan, Esq.

(57) ABSTRACT

Drill with a straight chucking groove, with a convexly curved main cutting edge with, adjacent to the main cutting edge, a convexly designed region of groove base and with, adjacent to the convexly designed region of the groove base, a concavely designed groove base or a concavely curved main cutting edge with, adjacent to the main cutting edge, a concavely designed groove base with, adjacent to the concavely design region of the groove base, a convexly design region of the groove base.

10 Claims, 10 Drawing Sheets

(56) References Cited

U.S. PATENT DOCUMENTS

| | | | |
|---|---|---|---|
| 2,145,819 A * | 1/1939 | Swenson | 408/222 |
| 2,322,894 A * | 6/1943 | Stevens | 408/230 |
| 4,802,799 A * | 2/1989 | Rachev | 408/144 |
| 5,160,232 A * | 11/1992 | Maier | 408/223 |
| 5,282,705 A * | 2/1994 | Shiga et al. | 408/211 |
| 5,443,585 A | 8/1995 | Kawase et al. | |
| 5,678,960 A * | 10/1997 | Just et al. | 408/230 |
| 6,213,692 B1 * | 4/2001 | Guehring et al. | 408/144 |
| 7,201,543 B2 * | 4/2007 | Muhlfriedel et al. | 408/230 |
| 2006/0275092 A1 * | 12/2006 | Yamamoto | 408/230 |
| 2008/0060478 A1 | 3/2008 | Wang et al. | |

FOREIGN PATENT DOCUMENTS

| | | | | |
|---|---|---|---|---|
| JP | 55090212 A * | 7/1980 | | B23B 51/02 |
| JP | 62009811 A * | 1/1987 | | B23B 51/06 |

* cited by examiner

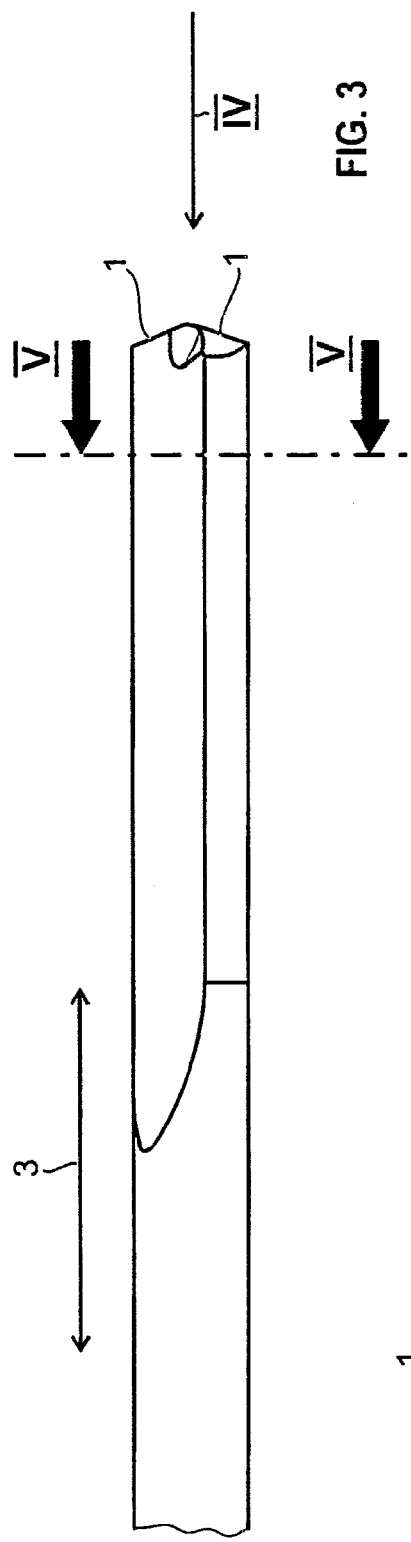
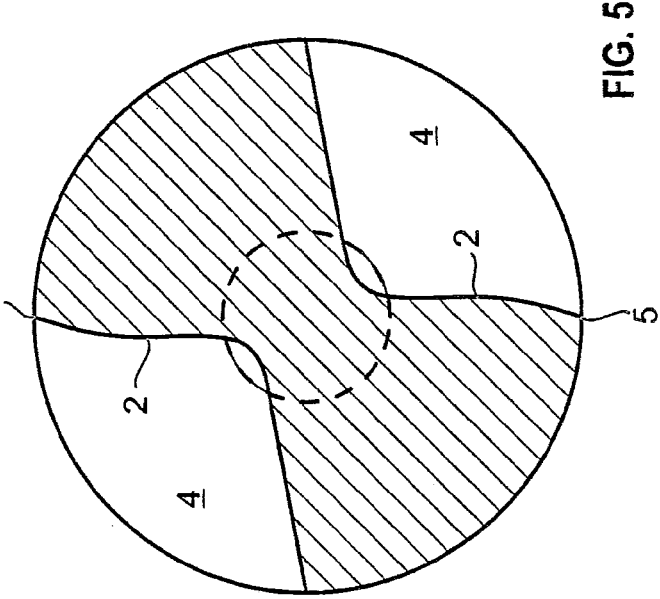
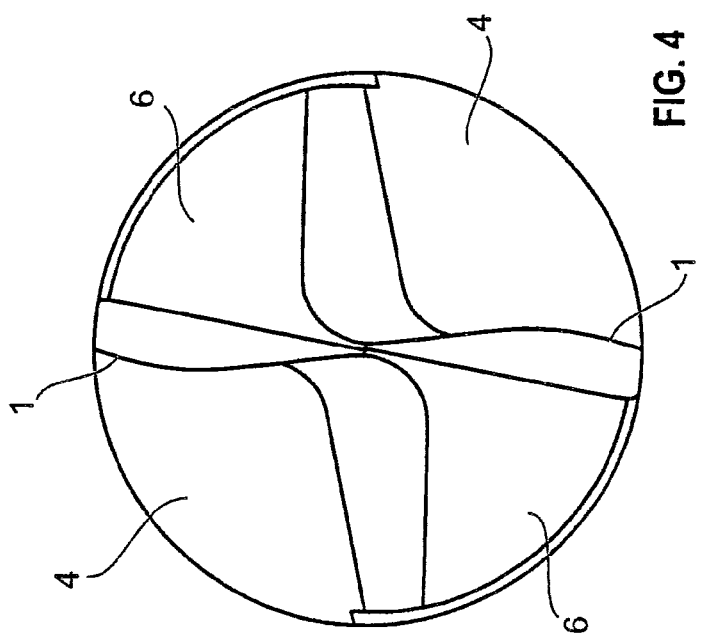

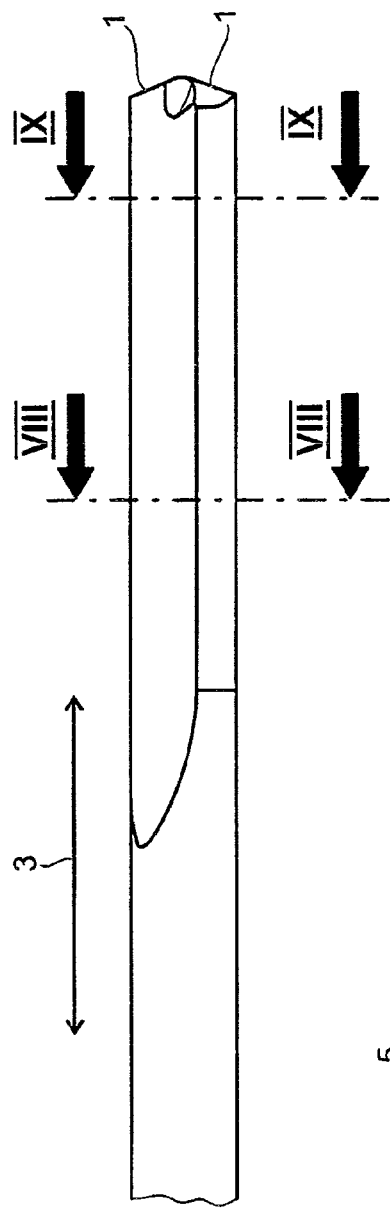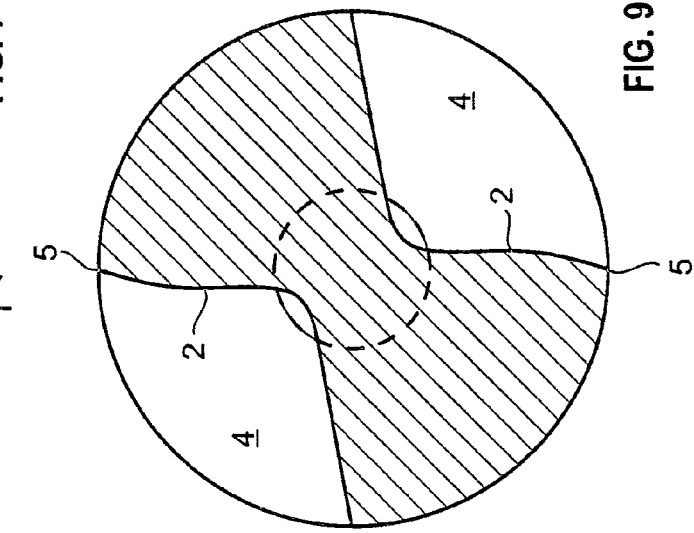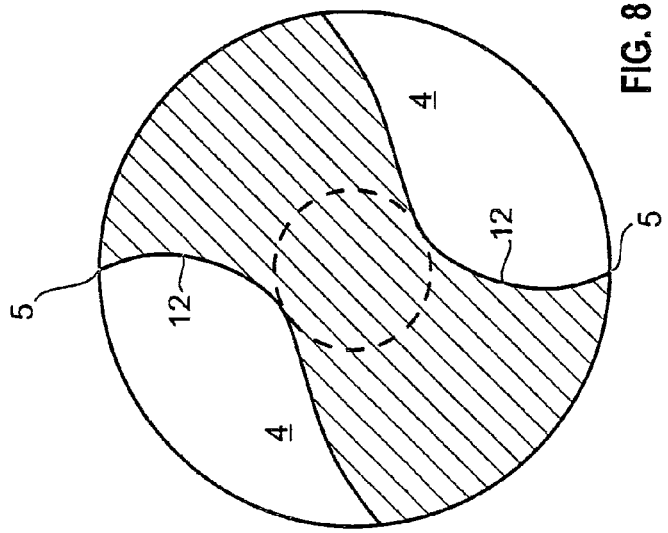

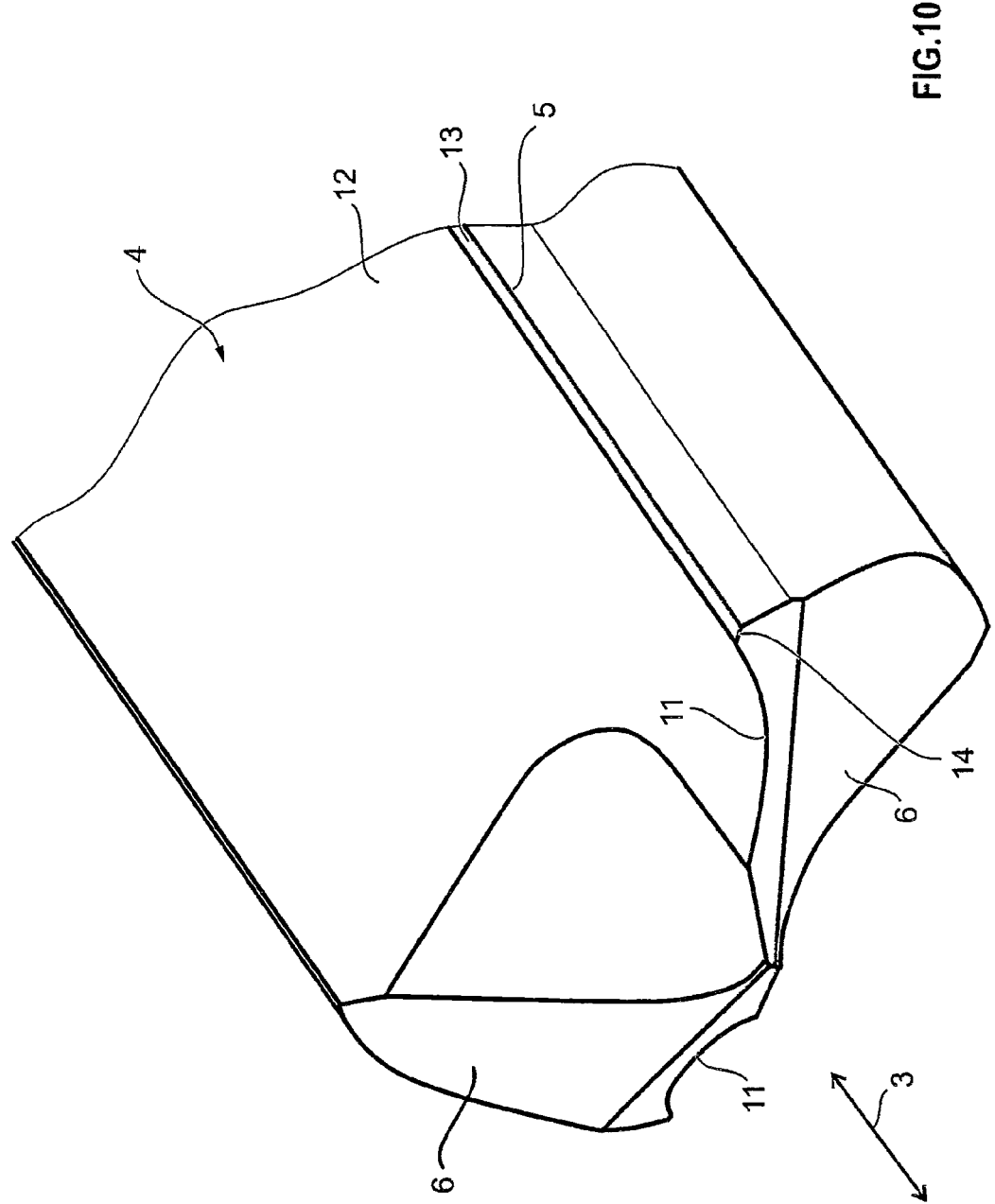

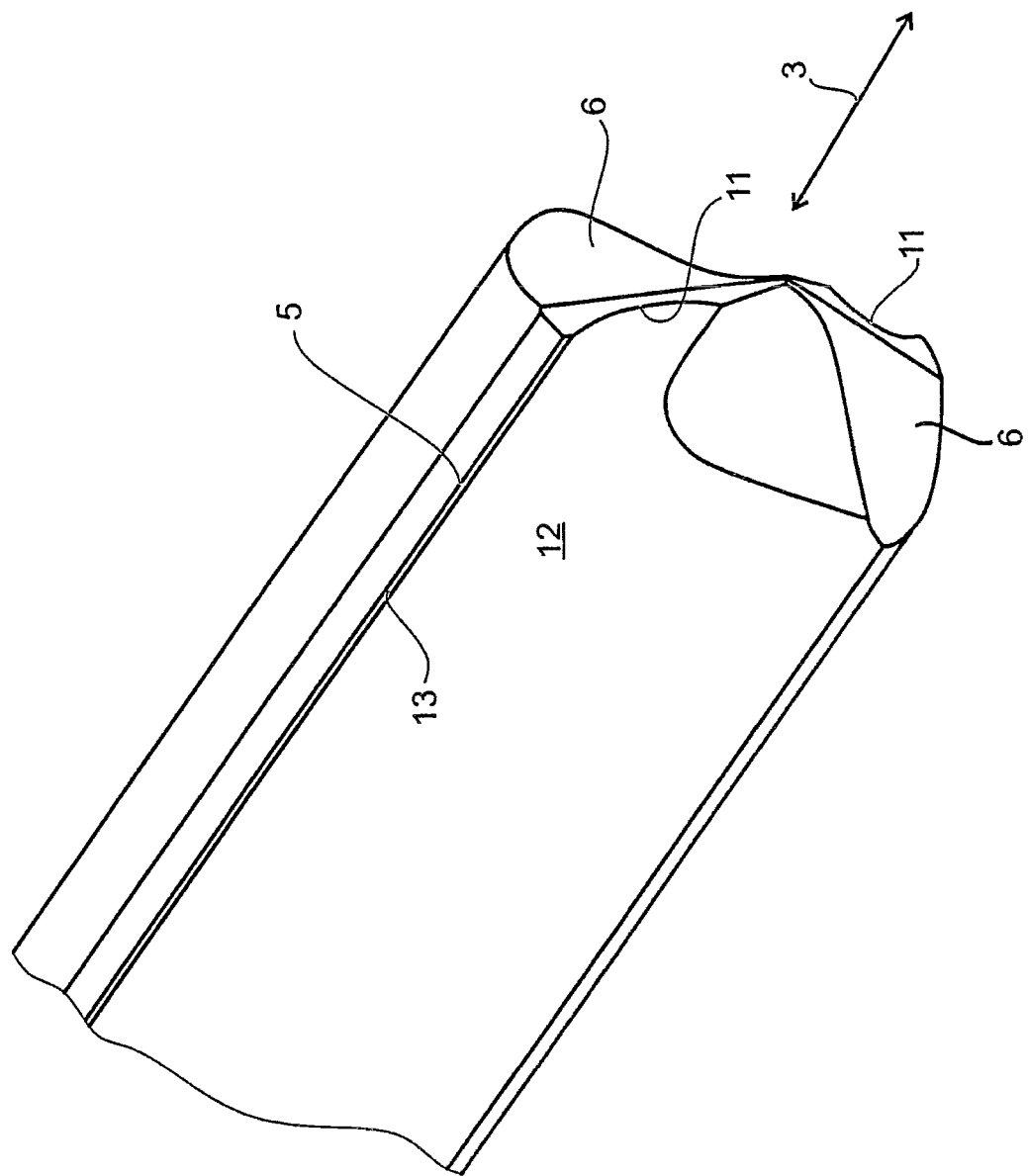

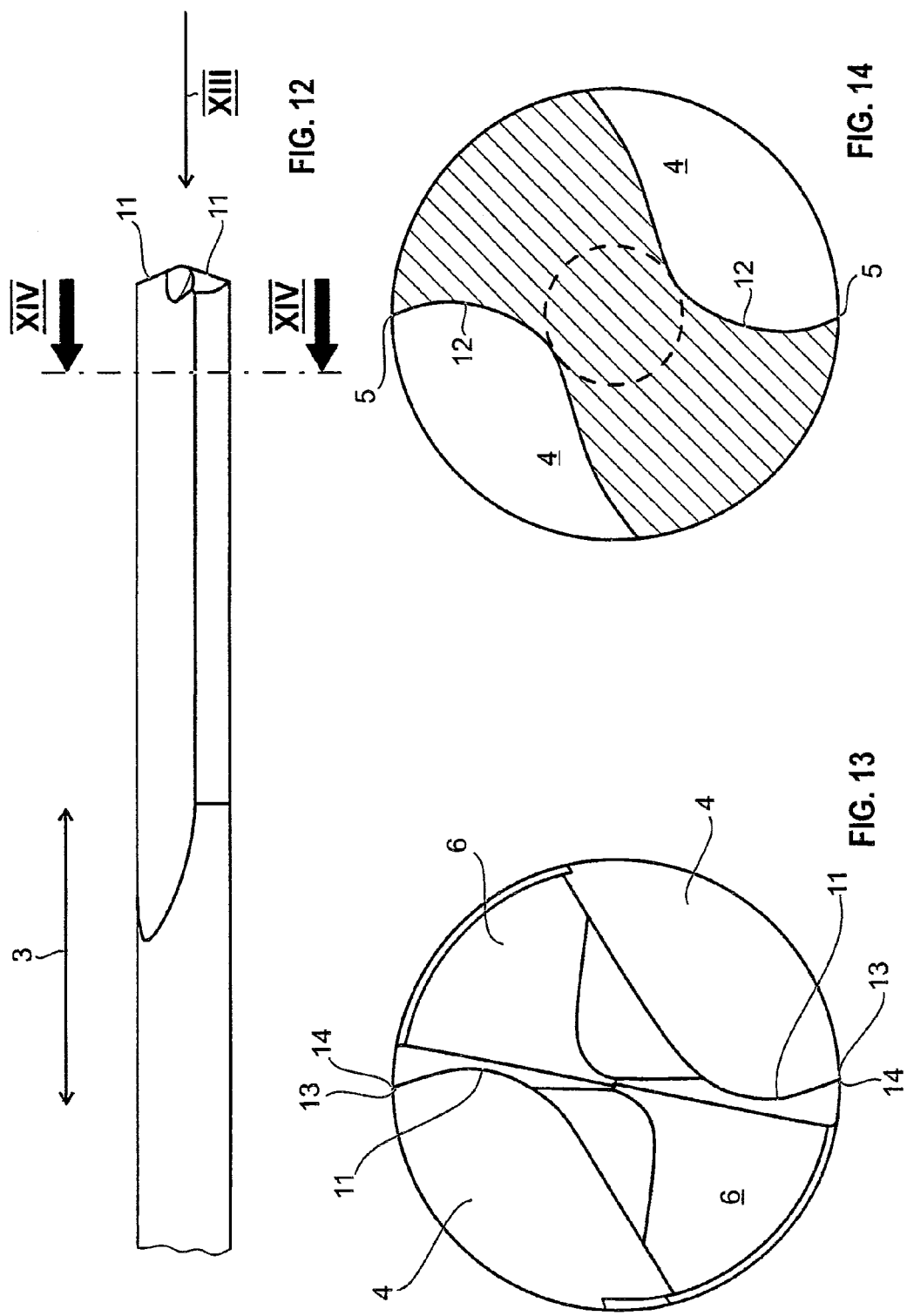

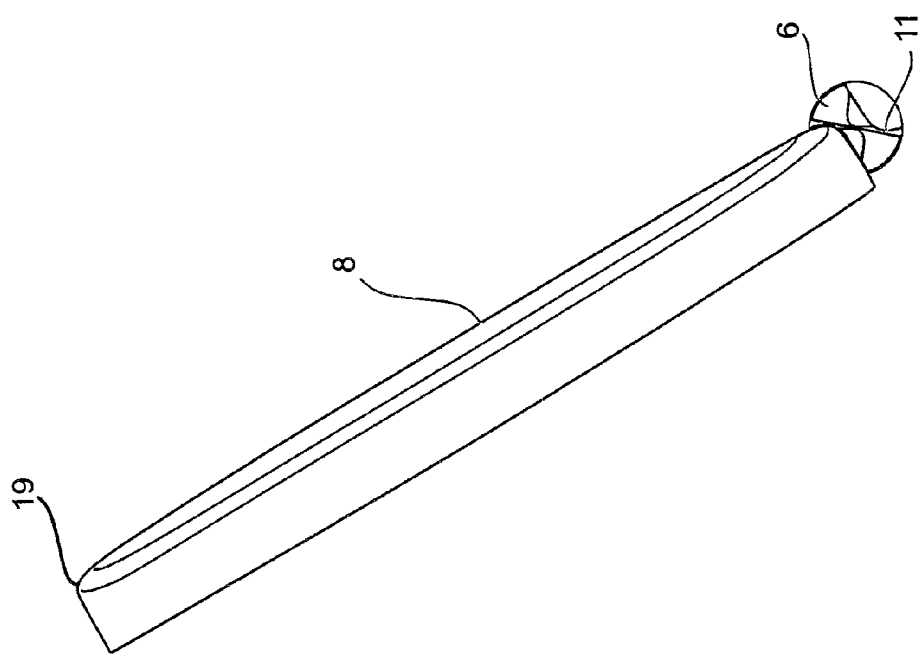

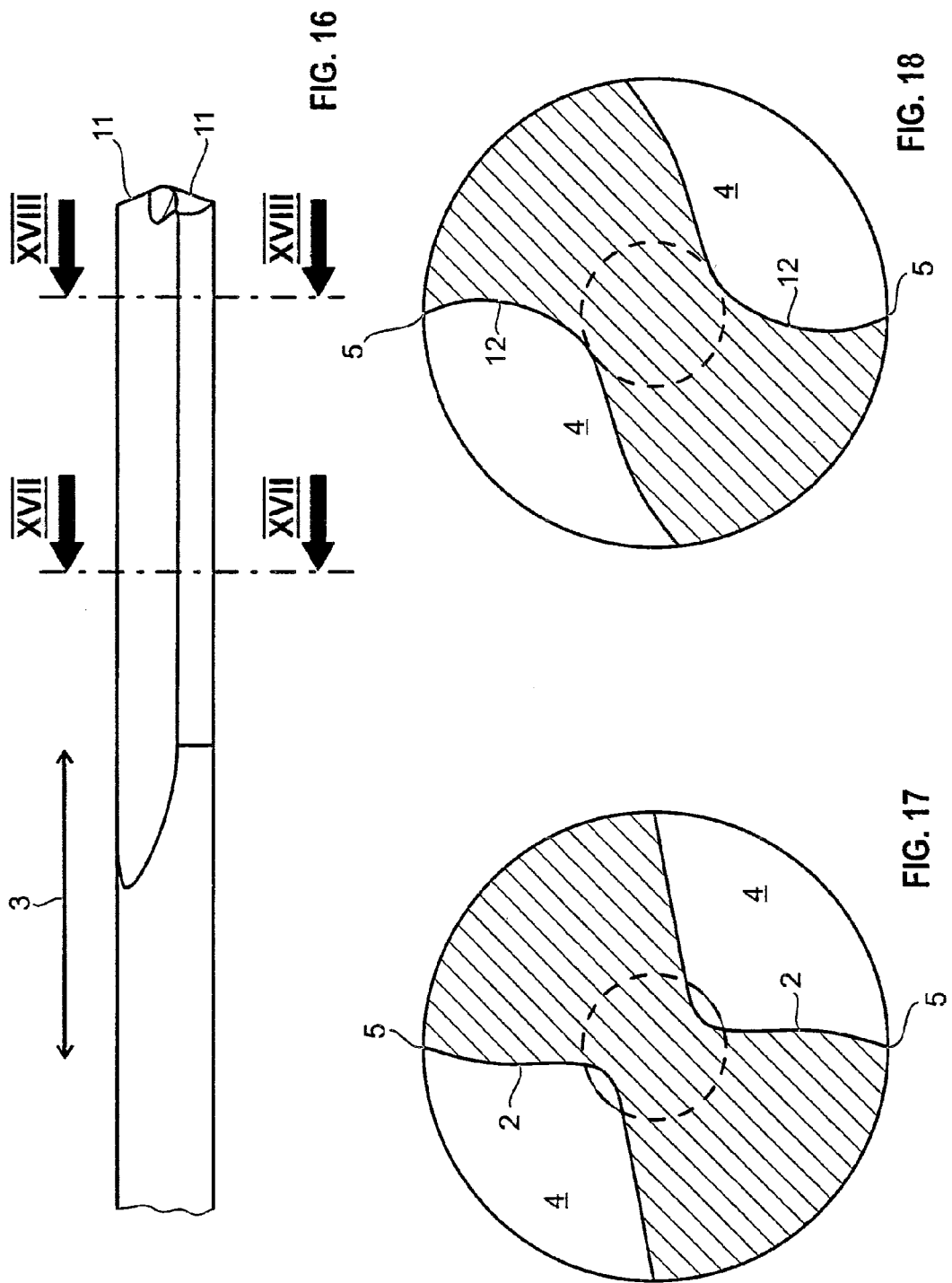

DRILL

BACKGROUND OF THE INVENTION (1) Field of the Invention

The invention relates to a drill comprising straight flutes. Drills comprising straight flutes are especially suitable for cutting short-chipping materials. In these drills, the flutes serve to remove the chips.

(2) Description of the Prior Art

In the case of innately long-chipping materials, however, there is the problem that the long chips jam over the course of the straight flute between the outlet of the flute and the adjoining secondary cutting edge. However, such jamming cannot be observed in the case of short-chipping materials. In cutting technology, therefore, it has been conventional practice for a long time to use drills having helical flutes. In this case, the helix configuration of the flutes has the function of diverting, as it were, the flow direction of the chips in order to break the chips inside the flute. As a result of this chip breaker function of the helical flutes, short chips are also produced in the case of long-chipping materials, which short chips can be removed by the helical flute without jamming between flute and secondary cutting edge.

A disadvantage in the case of the tools having a helical flute is the reduced bending resistance of the drill.

In the straight fluted drills according to the prior art, the main cutting edge has just as straight a course as the flute. As a result of the identical course of the main cutting edge and flute, said main cutting edge and flute can be ground in the tool in one operation by means of a grinding wheel.

Finally, it is known in the field of drills having a helical flute to give the main cutting edge an in particular nonlinear shape in order to influence the cutting behavior, for example the cutting edge sharpness or the stability of the cutting edge.

Proceeding from the prior art described at the beginning, the object of the invention is to provide a drill which is resistant to bending and which at the same time has a chip-breaking action and is especially suitable for cutting innately long-chipping material using short chips.

SUMMARY OF THE INVENTION

Proceeding from the known fact that the use of a flute which is straight with respect to the center longitudinal axis of the drill increases the stiffness of the drill, the invention combines for the first time such a drill comprising a straight flute with a nonlinear cutting edge. In this case, the invention utilizes the knowledge that the use of a curved main cutting edge already results in the chip being rotated into the straight flute; the chip therefore already experiences a change in direction due to the nonlinear configuration of the cutting edge, and this change in direction finally results in the chip being broken in the flute. The chip forming is therefore influenced and assisted in the desired direction through the use of the nonlinear cutting edges. In addition, the torsional stiffness and the bending resistance of the drill are increased by a drill cross section having curved cutting edges.

In principle, the invention distinguishes between a configuration of the drill having a convexly curved main cutting edge on the one hand and a concavely curved main cutting edge on the other hand.

The configuration having a convexly curved main cutting edge entails more of a protected configuration of the cutting edge corner. The cutting edge is thus very wear-resistant. It is also advantageous in a further configuration to adapt the root of the flute to the curved shape of the main cutting edge. Thus, in one embodiment of the invention, the flute root is to be concavely shaped following the convexly curved main cutting edge. A desired positive rake angle is produced as a result. Such a positive rake angle results in a "sharp cutting edge". Said cutting edge is especially suitable for cutting soft materials.

In addition, the design of the flute root is further varied. The flute of the drill is divided into two regions, namely, in the case of a convexly curved main cutting edge, into an adjoining convexly designed region of the flute root which leads into an adjoining concavely designed region of the flute root. The discharge direction of the chips is also changed by this variation in the shape of the flute root, and so the breaking behavior of the chips over the chip discharge section in the flute can be influenced by the configuration of the flute root. At the same time, the secondary cutting edge of the drill also varies. A convex configuration of the drill secondary cutting edge is accompanied by the convex configuration of the flute root. This similarly applies to the concave design of flute root and drill secondary cutting edge. In a preferred configuration, the two regions forming the flute of the drill are the same length. An equally long region having a concavely designed flute root therefore adjoins the convexly designed region of the flute root.

In the second embodiment, the main cutting edge is concavely curved. In the region of the cutting edge corner subjected to particular loading, this concavely curved main cutting edge is especially aggressive, which results in an especially high cutting capacity. In contrast, however, the cutting edge corner is very exposed and is therefore susceptible to wear.

In this embodiment, too, a flute having a concavely designed flute root is assigned to the concavely curved main cutting edge. To provide an alternating concave secondary cutting edge and convex secondary cutting edge and to provide varying flute regions, provision is in turn made for the concavely designed region of the flute root adjoining the main cutting edge to be supplemented by a region having a convexly designed flute root which in turn adjoins said concavely designed region. In this configuration, too, it is again advantageous to design the two flute regions to be the same length. The concavely designed region of the flute root is therefore then just as long as the region having a convexly designed flute root.

In addition, in the case of the concavely designed main cutting edge, there is the tendency to draw, as it were, the chip into the flute, such that the chip is conveyed away from the active point of the main cutting edge very quickly.

The straight flutes according to the invention can have a positive slope of up to 5°. It is likewise possible for the straight flutes to be configured in such a way that they have a negative slope of up to −5°. The flutes having a positive or a negative slope therefore have a certain inclination over the course thereof.

In the region of the drill point or of the drill end face, it is possible to provide both point thinning and a split point or a four-facet point. The cutting edge corners of the drill can also have a corner radius, that is to say a rounded portion or a corner bevel for supporting the cutting edge corners. A sharp, non-rounded corner shape is suitable for the cutting, for example, of aluminum materials. A rounded corner shape, however, is suitable, for example, for cutting cast materials. It is also possible with the invention for the main cutting edges and also the secondary cutting edges to be of non-rounded or rounded configuration or for the stability thereof to be increased by making a bevel.

Finally, it is also possible for more than two regions configured differently with regard to the design of the flute root to be provided in the flute. Furthermore, provision is made for a region having a convex or concave flute root configuration to first of all follow the convex or concave cutting edge in order for a region having a straight flute root to adjoin said region having a convex or concave flute root configuration, and a region having a convexly or concavely configured flute root can in turn adjoin said region having a straight flute root.

With the invention, it is possible for the first time to use a straight fluted drill for cutting long-chipping and/or higher strength materials.

BRIEF DESCRIPTION OF THE DRAWINGS

FIG. 3 shows a side view of the drill shown in FIG. 1 and FIG. 2, FIG. 4 shows a front view according to arrow IV in FIG. 3, FIG. 5 shows the section V-V in FIG. 3, FIG. 7 shows a side view of a drill having a convexly curved cutting edge, an adjoining region of the flute having a convexly designed flute root, and an adjoining region of the flute root having a concave design, FIG. 8 shows section VIII-VIII from FIG. 7, FIG. 9 shows section IX-IX from FIG. 7, FIG. 10 shows a perspective view of the drill point of a drill having a concavely curved main cutting edge, FIG. 11 shows a further perspective view of the drill section shown in FIG. 10, FIG. 12 shows a side view of the drill shown in FIG. 10 and FIG. 11, FIG. 13 shows a front view according to arrow XIII in FIG. 12, FIG. 14 shows the section XIV-XIV in FIG. 12, FIG. 15 shows the plan view of the drill point according to FIG. 13 with the possible shape and position of the associated grinding wheel, FIG. 16 shows a side view of a drill having a concavely curved cutting edge, an adjoining region of the flute having a concavely designed flute root, and an adjoining region of the flute root having a convex design, FIG. 17 shows section XVII-XVII from FIG. 16, FIG. 18 shows section XVIII-XVIII from FIG. 16.

DETAILED DESCRIPTION OF THE INVENTION

Figure 1:
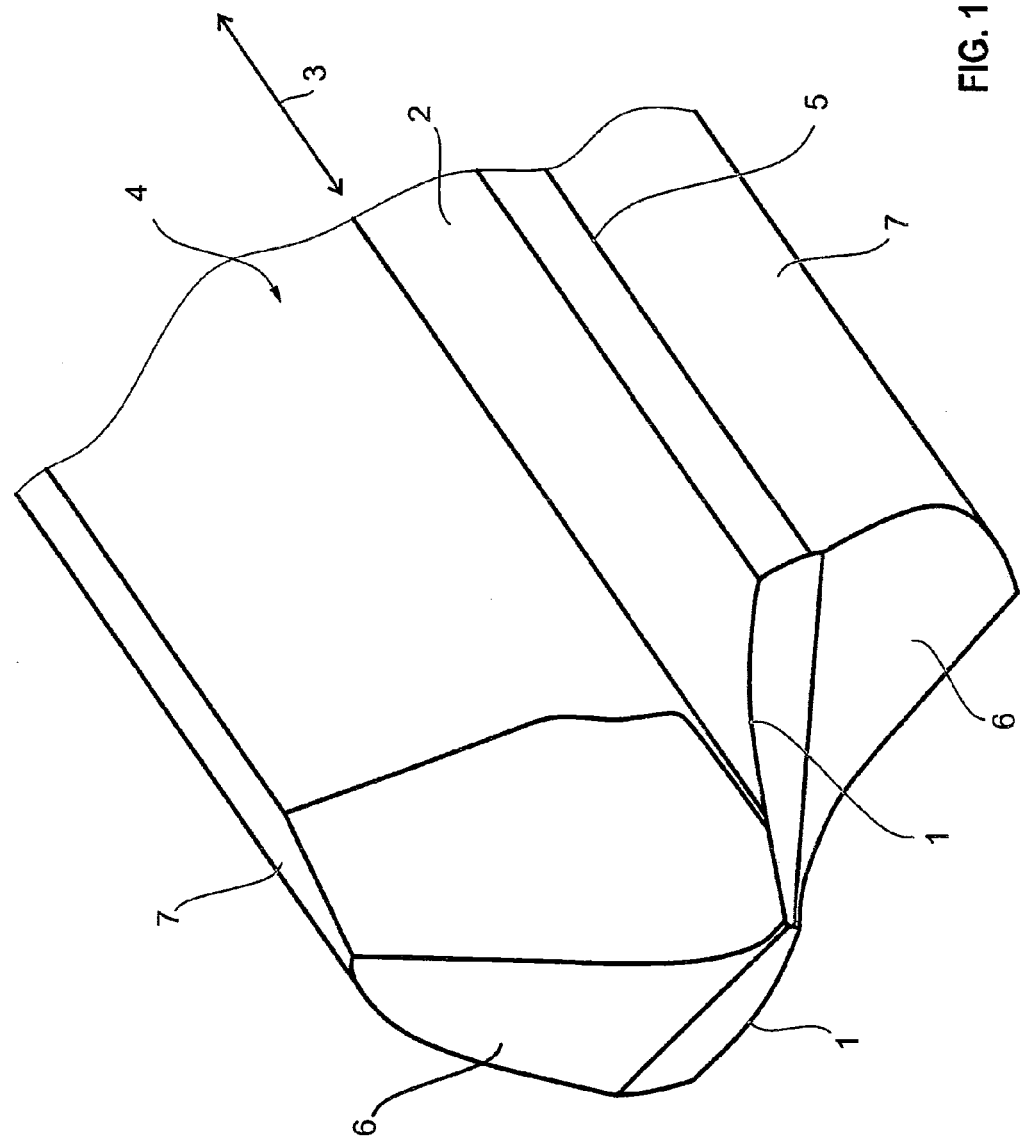
FIG. 1 shows a perspective view of the drill point of a drill having a convexly curved main cutting edge.
Figure 2:
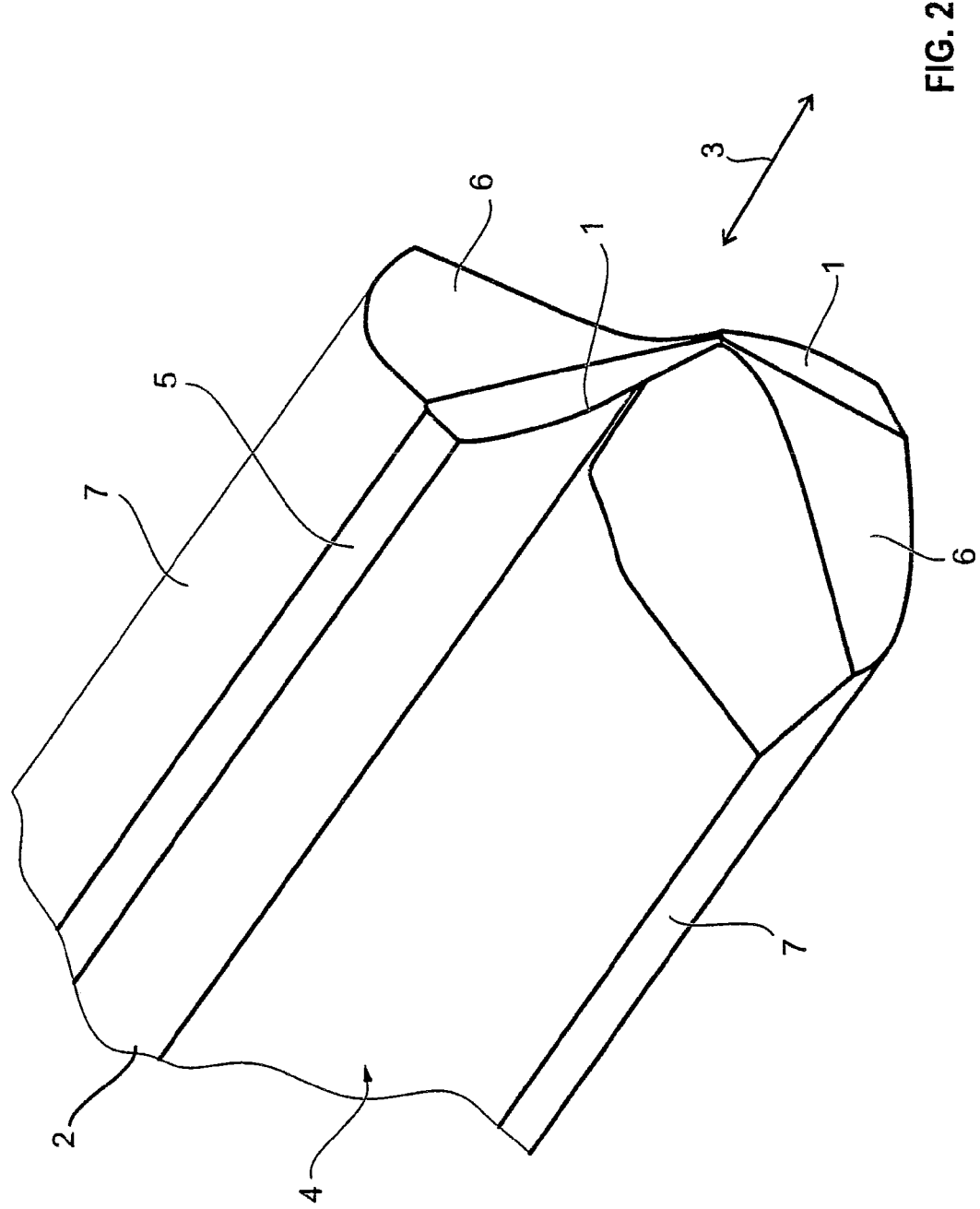
FIG. 2 shows a further perspective view of the drill section shown in FIG. 1.

FIG. 1 shows the convex main cutting edge 1, formed in pairs, as is normal in the case of drills, and the convex flute root 2 adjoining the convex main cutting edges 1. The convexly designed flute root 2 is an integral part of the straight flute 4 extending in the longitudinal direction 3 of the drill. The flute 4 is defined at its circumferential surface by the secondary cutting edge 5. Furthermore, a main flank 6 respectively adjoins the convex main cutting edge 1, whereas the secondary flanks 7 adjoin the secondary cutting edges 5. The convex design of the convex main cutting edges 1 can be seen especially clearly in the front view of FIG. 4. It can also be seen from the illustration in FIG. 4 that the convex design of the convex main cutting edges 1 results in a certain deflection of the chips, such that the chips are drawn, as it were, with a certain twist into the flutes 4.

It can be seen from the illustration in FIG. 5 that those regions of the flutes 4 which adjoin the secondary cutting edges 5 are also each designed as a convex flute root 2.

Figure 6:
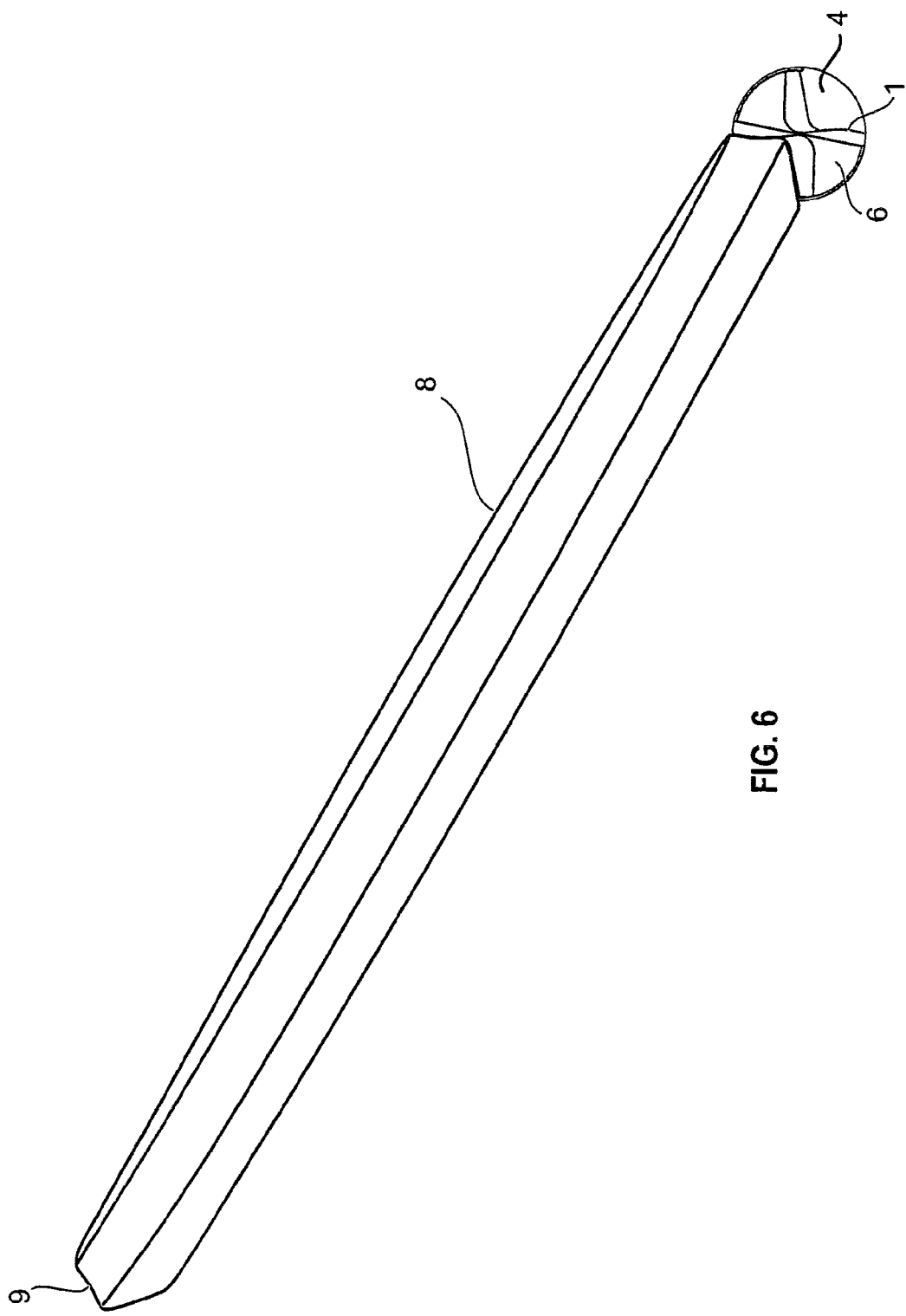
FIG. 6 shows the plan view of the drill point according to FIG. 4 with the possible shape and position of the associated grinding wheel.

Finally, FIG. 6 shows a grinding wheel 8 designed as a form tool. This grinding wheel 8 acts obliquely on the convex main cutting edge 1 and has, on its lateral area, a concave machining surface 9 designed to be complementary to the convex form of the convex main cutting edge 1.

FIG. 9 shows the drill according to the invention with a convex main cutting edge 1. The region of the flutes 4 having a convex flute root 2, said region being shown in cross section in FIG. 9, adjoins the convex main cutting edges 1. In the center longitudinal direction 3, as viewed from the convex main cutting edges 1, a further region having a concave flute root 12 adjoins the region having a convex flute root 2. A section through the region having a concave flute root is shown as section VIII-VIII in FIG. 7 and in FIG. 8. It can be seen from the illustration in FIG. 8 that the secondary cutting edges 5 in the region having the concave flute root 12 of the flute 4 have a positive rake angle.

According to FIG. 10, the drill has a main cutting edge pair formed from two concave main cutting edges 11. At the drill circumference, the concave main cutting edges 11 are each defined by a cutting edge bevel 13. This cutting edge bevel serves to stabilize the sharply pointed and thus aggressive cutting edge corner 14 on the one hand and the likewise aggressively cutting secondary cutting edges 5 on the other hand.

The concave flute root 12, that is to say the concavely designed region of the flute 4, adjoins each concave main cutting edge 11 in the longitudinal direction 3 of the drill.

First of all the concave course of the concave main cutting edges 11 and also the concave course of the concave flute root 12 can be seen again from the illustration in FIG. 12, FIG. 13 and FIG. 14. In particular the section IX-IX in FIG. 12 and FIG. 14 showing the section show the concave flute root 12 and the resulting aggressive secondary cutting edge 5 having a positive rake angle. A grinding wheel 8 acting obliquely on the drill point for machining the concave main cutting edge 11 can be seen again from the illustration in FIG. 15. This grinding wheel 8 has on the circumference thereof a convex machining surface 19 designed to be complementary to the concavity of the concave main cutting edge 11. The convex machining surface 19 is formed by a rounded-off corner region of the grinding wheel 8.

Finally, FIGS. 16, 17 and 18 show a combined tool having first a concave main cutting edge 11, an adjoining concave flute root 12 within the flute 4, and an adjoining region having a convex flute root 2 as viewed in the center longitudinal direction 3 from the concave main cutting edges 11. In this connection, it can be seen from the illustration of FIG. 17 that the region having a convex flute root 2 shown in section XVII-XVII and in FIG. 17 has a negative rake angle.

In summary, the use of a main cutting edge pair composed of convex main cutting edges 1 and a region of a flute 4 having a convex flute root 2, said region adjoining said main cutting edge pair in the center longitudinal direction 3 of the tool, results in the advantage that the cutting edge corners of the tool are more durable. On account of this greater durability, tougher materials can be cut. This also assists the forming and disposal of the chips.

The use of a tool having a main cutting edge pair consisting of concave main cutting edges 11 and a region of the flutes 4 having a concave flute root 12, said region adjoining said main cutting edge pair in the center longitudinal direction 3 of the tool, increases the volume of the flutes 4 and thus creates a larger space for the chip disposal. The cutting edge corners 14 are in this case markedly more aggressive, as are the secondary cutting edges 5. In this way, more brittle materials or materials which have high strength but which fracture easily can be machined more easily.

The invention claimed is:

1. A drill comprising a straight flute, a convex main cutting edge and a solid shank opposite the convex main cutting edge, the straight flute having a convexly designed flute root adjoining the convex main cutting edge and extending only a first length from the convex main cutting edge in a longitudinal direction of the drill, and a concavely designed flute root adjoining the convexly designed flute root at the first length and extending only from the first length to a second length in the longitudinal direction of the drill without overlapping the convexly designed flute root.

2. The drill as claimed in claim 1, wherein the convexly designed flute root and the concavely designed flute root each have the same length.

3. The drill as claimed in claim 1 wherein a region having a straight flute root adjoins the convexly designed flute root, and adjoining the straight flute root in turn is a concavely designed flute root.

4. The drill as claimed in claim 1, wherein the flutes have a positive slope of up to +5°.

5. The drill as claimed in claim 1, wherein the flutes have a negative slope of up to −5°.

6. A drill comprising a straight flute, a concave main cutting edge and a solid shank opposite the convex main cutting edge, the straight flute having a concavely designed flute root adjoining the concave main cutting edge and extending only a first length from the concave main cutting edge in a longitudinal direction of the drill, and a convexly designed flute root adjoining the concavely designed flute root at the first length and extending only from the first length to a second length in the longitudinal direction of the drill without overlapping the concavely designed flute root.

7. The drill as claimed in claim 6, wherein the convexly designed flute root and the concavely designed flute root each have the same length.

8. The drill as claimed in claim 6, wherein a region having a straight flute root, and adjoining the straight flute root in turn is a convexly designed flute root.

9. The drill as claimed in claim 6, wherein the flute has a positive slope of up to +5°.

10. The drill as claimed in claim 6, wherein the flute has a negative slope of up to −5°.

* * * * *